United States Patent Office 3,455,857
Patented July 15, 1969

3,455,857
VINYL MODIFIED ALKYD AND URETHANE RESINS AND METHOD FOR THE PREPARATION THEREOF
Edward Julius Holzrichter, Chicago, Ill., assignor to PRA Laboratories, Inc., Chicago, Ill., a corporation of Illinois
No Drawing. Filed Jan. 10, 1966, Ser. No. 519,518
Int. Cl. C08g *20/38, 17/14;* C08f *21/00*
U.S. Cl. 260—22          10 Claims

ABSTRACT OF THE DISCLOSURE

Vinyl modified alkyd and urethane resins are provided by copolymerizing a vinyl monomer such as styrene, acrylic acids and esters, and others, with an intermediate having the following formula:

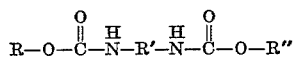

In the above, R is a residue of an alkyd resin or a polyurethane resin. R' is an arylidene radical, and R" is a residue of a hydroxyloweralkyl ester of acrylic acid or methacrylic acid. The intermediate is prepared by combining either an alkyd resin or a polyurethane resin with the ester before adding the arylidene diisocyanate.

---

This invention relates to novel vinyl modified copolymer compositions, and relates to methods whereby such copolymers may be successfully produced. More specifically, this invention relates to vinyl modified alkyd and urethane resins useful in the coatings art.

Some vinyl modified alkyd resins, such as the styrenated alkyds or the methacrylated alkyds, are known to the prior art. Their utility, however, has been severely limited. Certain important limits in composition and performance have been imposed upon them by the nature of the chemical reactions which have been necessary for their preparation.

The methods of the prior art are based upon the fact that certain highly unsaturated oils will interpolymerize with certain vinyl monomers at elevated temperatures. The resulting copolymers have had fast apparent dry, but because the most active unsaturation has been destroyed in the process of reacting with the vinyl monomer, the actual oxidative dry and conversion to a gelled solvent resistant state has been either greatly retarded or completely inhibited. In order to get products which are compatible and generally useful in the coatings art it has been necessary to choose either alkyd resins containing substantial quantities of highly unsaturated oils such as linseed or dehydrated castor oil, or vinyl monomers which tend to give polymers that are more compatible with alkyd resins, such as vinyl toluene or α-methyl styrene. The use of vinyl toluene or α-methyl styrene has yielded copolymers which are notorious for their poor solvent resistance.

The processes of the prior art, depending upon participation of the oil in the polymerization reaction for compatibility and resulting usefulness in the coatings art, must be conducted at temperatures high enough to activate the oil component. This requirement limits their utility in two ways. First, it means greater expense in reactor design, calling for high capacity condensers and more elaborate heating equipment. Secondly, it means that low boiling solvents and monomers must be used sparingly or not at all.

Finally, according to the methods of the prior art, some compositions have been impossible to prepare successfully. Generally speaking, solvents for the copolymers have had to be solvents for the vinyl polymers, as the level of copolymerization has been too low to induce solubility of the vinyl polymer. Thus, for instance, there are no methyl methacrylated urethane oils which are soluble in mineral spirits prepared by the methods of the prior art.

Accordingly, it is an object of this invention to provide new and useful alkyd and urethane copolymer resins of improved properties.

Another object is to produce alkyd and urethane copolymer resins without retarding or destroying the ability of said resins to provide films which dry through oxidative mechanisms to an improved solvent resistant state.

Another object is to produce useful alkyd and urethane copolymer resins which can be made soluble in the ordinary aliphatic trade sales solvents.

Another object of this invention is to produce vinyl modified alkyd and urethane copolymer resins which are free of highly unsaturated oils, or if desired, completely free of oil.

Another object of this invention is to provide useful and novel copolymer compositions, such as vinyl acetate modified or methyl methacrylate modified urethane oils based upon saturated or semi-drying oils which are soluble in ordinary petroleum mineral spirits.

The foregoing objects are attained, together with other objects which will become apparent from consideration of the following disclosure of the invention.

For the successful practice of this invention, an intermediate is prepared which is subsequently copolymerized with an appropriate reactive vinyl monomer such as styrene, substituted styrene, vinyl toluene, various lower esters of methacrylic or acrylic acids, vinyl acetate, or the like. The preparation of the intermediate requires attention to certain compositional variables and also certain processing features as will be fully disclosed. The intermediate may be represented by the following formula:

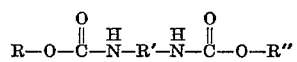

The R represents the radical of an alkyd resin or a polyurethane resin.

The R' represents the arylidene radical of commercial tolylene diisocyanate. At the present time this material is the only organic diisocyanate which is both commercially available and economically acceptable. It is quite possible that as new diisocyanates or polyisocyantes become available they can be utilized in the practice of this invention.

The R" represents the residue of a hydroxyalkyl acrylate or hydroxyalkyl methacrylate, such as hydroxypropyl or hydroxyethyl acrylate or methacrylate. For convenience, reference may be made to such materials as "copolymerizable hydroxyl functional monomers."

The structure of the intermediate as a whole may be described as an alkyd or urethane resin which has a reactive acrylic group attached to it by a urethane linkage.

In the synthesis of the intermediate, one of two procedures is used, depending on whether the product is intended to be a modified alkyd resin, or a modified urethane resin.

If the product is intended to be a modified alkyd resin, the esterification reaction is run in accordance with the standard and well-known techniques of alkyd production. In the formulation of the alkyd resin, only two considerations are vital to the successful practice of this invention. The first consideration is the hydroxyl to carboxyl ratio. There must be free hydroxyl groups remaining after the esterification reaction is completed. These are necessary to allow the attachment of the functional acrylic group to the alkyd resin via the urethane linkage in the final step of the intermediate preparation. The second consideration is the ability of the intermediate to undergo further polymerization without becoming gelled. Stated differently, the alkyd must be formulated at a functionality, as defined by Carothers and Flory, which is low enough to prevent the formation of significantly cross-linked polymers during the copolymerization step. The methods of formulating at low functionality are familiar to those practiced in the art.

The use of dehydrated castor oil or linseed oils is permitted, but not necessary in the practice of this invention. Alkyds based upon soya, cottonseed, and more saturated oils can be used without introducing incompatibility into the final products. In fact, oil-free alkyds may be used in the preparation of suitable intermediates. Once the alkyd resin is prepared and allowed to cool, the final steps in the production of the intermediate may be undertaken. To accomplish this intermediate preparation, the alkyd resin is mixed with the hydroxyalkyl methacrylate or acrylate, which are lower alkyl esters of acrylic and methacrylic acids. The mixing must be thorough, and if the alkyd resin is viscous, solvents and vinyl monomer may be used to thin down the mixture and facilitate the blending. When the mixture is homogenous, the tolylene diisocyanate is added. The diisocyanate reacts with the free hydroxyl groups of both the alkyd resin and the hydroxyalkyl acrcylate or methacrylate to complete the formation of the desired intermediate.

When the product is intended to be a vinyl modified urethane, the preparation of the intermediate involves the following steps.

If the composition is to be based on a triglyceride vegetable oil, the oil is first alcoholyzed. That is, the oil is made to undergo ester interchange with a suitable polyol such as glycerol, pentaerythritol, trimethylol ethane, trimethylol propane, sorbitol, methyl glucoside, etc. The methods of accomplishing ester interchange are well-known to the art, and consist of heating the oil and polyol together with a small portion of catalyst. Among the useful catalysts are PbO, LiOH·H$_2$O, calcium naphthenate or oxide, etc. When the alcoholysis reaction has been accomplished the fatty acids have been distributed on the polyols and are ready to undergo the urethane reaction.

If the composition when finished is to be oil free, the alcoholysis reaction can be omitted.

The next step in this preparation of a suitable intermediate involves mixing of the polyol, whether an oil alcoholysis product, or a simple polyol, or a mixture thereof, with the hydroxyalkyl acrylate or methacrylate. Again solvents and vinyl monomers may be used to facilitate mixing.

The intermediate is then completed by the addition of an appropriate amount of tolylene diisocyanate. The appropriate amount is that amount sufficient to produce a urethane resin containing attached reactive alkyl acrylate or methacrylate. Again, the type and amount of oil used, if any, is not vital to the formation of compatible products in the final step of copolymer preparation. Also, as with the alkyd intermediates, functionality is important in determining the relative amounts of materials in the overall composition. The foregoing urethane resin may also be referred to herein as a "polyurethane resin" to further distinguish the resin from the urethane linkage in the intermediate. Likewise, the final copolymer may be interchangeably considered as a vinyl modified urethane or polyurethane resin. The described method for preparing the polyurethane resin based intermediate is preferred although the polyurethane resin could be formed in a separate step before completing the intermediate with its urethane linkage.

As has been indicated, the desired structure of an intermediate useful in this invention has the structure graphically pictured as,

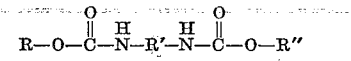

where R is the residue of an alkyd or urethane resin, R' is the tolylene radical of the diisocyanate, and R" is the alkyl acrylate or methacrylate residue.

Since this is the desired structure, it is important to maximize the probability that this will be the structure which is predominant in the intermediate. Therefore the procedures outlined above are important and must be followed for the successful practice of this invention. If, for instance, the alkyd resin is prepared, mixed with the tolylene diisocyanate, and then after thorough mixing, the hydroxyalkyl acrylate added, the process will not work. The mixing of the tolylene diisocyanate with the alkyd resin favors the formation of the following structure alone:

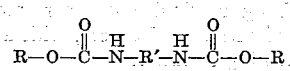

where R represents the alkyd resin moiety.

This exhausts the supply of diisocyanate and prevents the formation of the desired intermediate. The result, upon copolymerization, is a product which is a useless incompatible mixture.

If, on the other hand, the hydroxyalkyl methacrylate or acrylate and the tolylene diisocyanate are allowed to come into contact before mixing with the alkyd resin or urethane resin, a dimethacrylate or diacrylate will be formed as illustrated by the following structure:

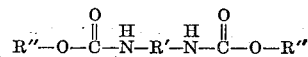

where R" is the hydroxyalkyl acrylate or methacrylate moiety.

This structure will cause early gelation in addition to incompatibility, and will prevent successful practice of this invention.

When the intermediate has been prepared according to the recommended method, the copolymerization is initiated using a vinyl polymerization catalyst which is operative at temperatures generally not above about 110° C. Examples of such catalysts are benzoyl peroxide and azobisisobutyronitrile. To obtain the most desirable products it is advantageous that the polymerization reaction be conducted at a temperature which does not activate the unsaturation of the drying oil component if there is one present.

The low temperatures are also advantageous from the standpoint of reactor economy. Reactors may be heated by low cost, low pressure steam. In most cases there is no reflux, so reactor condenser design is simple and economical.

The polymerization is generally conducted by small incremental additions of catalyst. These additions are generally made at 15 to 30 minute intervals and are sufficient to drive the reaction to near completion in about six to 10 hours.

In general, the alkyd or urethane resin portion of the copolymers of this invention will comprise 30% to 80% of the final copolymer non-volatile by weight. The level of hydroxyalkyl acrylate or methacrylate is generally kept below about 2% of the total copolymer non-volatile, as this is usually enough to effect compatability. Higher levels can be used if the level of tolylene diisocyanate is kept low enough to prevent unduly high functionality and resulting gelled polymers. Higher levels of these hydroxyalkyl acrylates and methacrylates are not generally used for a second reason, that is, they are relatively expensive materials.

In the alkyd resin based copolymers the level of tolylene diisocyanate is generally kept stoichiometric, or nearly stoichiometric, on a molar basis, with the hydroxyalkyl acrylate or methacrylate.

In the urethane resin based copolymers the tolylene diisocyanate level is much higher, being necessary for the formation of the polyurethane portion of the copolymer. Levels of tolylene diisocyanate might easily range from about 4% to about 25% of the total copolymer nonvolatile by weight.

The following examples are presented to illustrate various embodiments of the invention, but it will be understood that such examples are not intended to represent exclusive embodiments of the invention nor to operate to restrict the scope of the invention.

Example I.—Preparation of alkyd resin

Soybean oil _____lbs__ 5.08
Glycerol _____lbs__ 1.77
Litharge _____gm__ 1
Phthalic anhydride _____lbs__ 3.60

A typical alkyd resin, suitable for the practice of this invention, is prepared in the following way:

A stainless steel reactor of 2 gallons capacity, fitted with a cover, agitator, inert gas inlet tube, and a thermometer, typical of the fusion process alkyd kettles now common in the industry, was charged with the soybean oil and glycerol. Inert gas was sparged through the mixture at a rate of two liters per minute. The agitator was started, heat applied, and the mixture heated to 380° F. within 30 minutes. At this point the inert gas flow was reduced to one liter per minute in order to minimize the loss of glycerol. One gram of litharge was added as an alcoholysis catalyst. The mixture was further heated to 475° F., and held at this temperature for ester interchange. In about 30 minutes a sample of the mixture was soluble in five volumes of methanol (a test to indicate the level of ester interchange) and the phthalic anhydride was added. A temperature of 440° F. was regained, and the batch held for about 4 hours at this temperature. The resin was then cooled under inert gas and thinned to 70% nonvolatile content with xylol. The resin had the following physical characteristics:

Viscosity (Gardner-Holdt) _____seconds__ 8.0
Non-volatile content _____percent__ 70
Solvent _____ Xylol
Color (Gardner-Holdt) _____ 4–5
Acid value of nonvolatile _____ 16.0

The Gardner-Holdt viscosity was determined by the bubble viscosimeter method. The test is described in ASTM D–154–8, Test for Varnishes, procedures A and B.

The Gardner-Holdt color determinations are those described in ASTM D–155.

The acid value is recorded as the number of mg. of KOH necessary to neutralize a one gm. sample of test material.

Example II

Alkyd resin (Ex. I) _____gms__ 730
Styrene _____ms__ 272
Hydroxypropyl methacrylate _____gms__ 8
Tolylene diisocyanate _____gms__ 10
VM&P naphtha _____gms__ 132
Xylol _____gms__ 306
Benzoyl peroxide _____gms__ 9

A two liter glass flask equipped with stirrer, condenser, thermometer, and gas inlet tube was charged with alkyd resin prepared in Example I, styrene, and the hydroxypropyl methacrylate. The batch was agitated for five minutes to insure complete homogeneity. The tolylene diisocyanate was added, a trickle of inert gas started through the mixture, and heat applied by means of a hot water bath. When the mixture reached 50° C., four gms. of benzoyl peroxide were added. About one hour after the peroxide addition the batch reached a peak temperature of 106° C., and then started slowly downward as the exotherm subsided. Then one-half gm. increments of benzoyl peroxide were added consecutively at half hour intervals to drive the polymerization toward substantial completion. The copolymer preparation was completed by the addition of the xylol and VM&P naphtha. The resin solution thus produced had the following characteristics:

Viscosity (Gardner-Holdt) _____ 15.3 sec.
Non-volatile content _____ 52.7%.
Solvent _____ 8:2 xylol VM&P naphtha.
Color _____ 6.
Acid value of non-volatile _____ 11.
Wt./gallon _____ 8.06.
Appearance _____ Bright and stable.

Example III.—Polymeric phasing in absence of diisocyanate

An attempt was made to prepare a second resin from the alkyd resin of Example I, using the ingredients and procedure of Example II, except no tolylene diisocyanate was used. The product was a cloudy, incompatible mixture of alkyd resin and polystyrene which was not useful as a coatings vehicle.

Example IV.—Polymeric phasing in the absence of hydroxyalkyl methacrylates

An attempt was made to prepare a third batch of copolymer resin from the alkyd resin prepared in Example I. The same ingredients and steps were used again, except that this time no hydroxypropyl methacrylate was utilized. The product was an incompatible mixture of alkyd resin and polystyrene, again an unserviceable material.

The foregoing examples illustrate that neither the tolylene diisocyanate nor the hydroxylalkyl methacrylate alone is sufficient to effect compatible polymers. The formation of the intermediate structure necessary to provide compatible copolymers is dependent upon the presence of both the diisocyanate and the hydroxyalkyl methacrylate.

The following examples show that attention must be paid to the levels of tolylene diisocyanate and hydroxyalkyl methacrylate or acrylate employed in order to avoid gelled and useless products.

Example V.—Alkyd resin

Soybean oil _____lbs__ 5.8
Phthalic anhydride _____lbs__ 3.8
Glycerol _____lbs__ 1.4
Litharge _____gm__ 1
Xylol _____lbs__ 4.3

An alkyd resin, prepared fro mthe above formula according to the method of Example I, had the following characteristics:

Viscosity (Gardner-Holdt) _____ 3.0
Non-volatile content _____percent__ 70
Solvent _____ Xylol
Color (Gardner-Holdt) _____ 4
Acid value of non-volatile _____ 8.8
Appearance _____ Bright Example VI.—Styrene modified copolymer Gms.
Alkyd resin (Example V) _____ 757
Styrene _____ 280
40% hydroxypropyl methacrylate _____ 16
Tolylene diisocyanate _____ 8
Xylol _____ 549
Benzoyl peroxide _____ 14

The above formula was converted to a copolymer resin according to the procedures of Example II. The resulting copolymer displayed the following physical characteristics:

Viscosity (Gardner-Holdt) _____ 3.0 sec.
Non-volatile content _____ 49.2%.
Solvent _____ Xylol.
Color (Gardner-Holdt) _____ 4.

Acid value of non-volatile _____ 8.8.
Appearance _____ Bright and stable.

Example VII.—Gelled styrene modified copolymer

A second styrene modified copolymer was prepared from the alkyd resin of Example V. The formula and procedures of Example VI were used except that the weight of 40% hydroxypropyl methacrylate used was increased from 16 to 20 gms., while the weight of tolylene diisocyanate was increased to 10 gms. The copolymer obtained was in a state of incipient gelation and displayed the following physical characteristics:

Viscosity (Gardner-Holdt) _____ 10.4 sec.
Non-volatile content _____ 48.8%.
Solvent _____ Xylol.
Color (Gardner-Holdt) _____ 4.
Acid value of non-volatile _____ 9.0.
Appearance _____ Bright and unstable.

The gelation is caused by too much of the effective diisocyanate-alkyl acrylate linkage and the resulting increased functionality. It can be shown that very high levels of the tolylene diisocyanate can be tolerated if the hydroxyalkyl acrylate or methacrylate level is kept low and normal principles of functionality are observed in the formulation. The following example illustrates this principle.

Example VIII.—Methacrylate modified copolymer prepared with a high level of tolylene diisocyanate

| | Gms. |
|---|---|
| Safflower oil | 400 |
| Glycerol | 42 |
| LiOH·H$_2$O | 2 |
| Methyl methacrylate | 300 |
| 96% hydroxyalkyl methacrylate | 12 |
| Tolylene diisocyanate | 119 |
| Mineral spirits | 712 |
| Azobisisobutyronitrile | 6 |
| Pb naphthenate (24% Pb) | .25 |

A methacrylated urethane resin, soluble in mineral spirits, was prepared in the following way. The safflower oil and glycerol were charged into a two liter flask fitted with stirrer, condenser, thermometer and gas inlet tube. The oil and glycerol were heated under nitrogen gas to 400° F., at which point the LiOH·H$_2$O was added. The temperature was carried to 480° F. and held for thirty minutes, at the end of which time a sample was soluble in two volumes of methanol, indicating substantial ester interchange. The batch was fitted with a water bath and cooled to 180° F. A mixture of the methacrylate monomers was added to the flask. The Pb naphthenate catalyst was added, and over a period of fifty minutes the tolylene dissocyanate was added dropwise. Heat was applied to the water bath, and at 140° F. two gms. of azobisisobutyronitrile was added. The batch was heated to 200° F. and held there for three hours and forty-five minutes, during which time eight half-gram increments of azobisisobutyronitrile were added. Four hundred grams of mineral spirits were added during the processing, at a speed sufficient to maintain fluidity in the polymerizing mass. To finish the preparation three hundred twelve gms. more mineral spirits were added. The batch was filtered to remove a slight cloud which formed during the addition of diisocyanate.

The finished copolymer had the following final characteristics:

Viscosity (Gardner-Holdt) _____ 2.4 sec.
Non-volatile content _____ 52%.
Solvent _____ Mineral spirits.
Color (Gardner-Holdt) _____ 1.
Acid value of non-volatile _____ 1.
M.S. reducibility _____ Infinite.
Appearance _____ Bright and stable.

M.S. reducibility refers to the extent to which the resin can be diluted with mineral spirits without precipitating from solution.

Example IX.—Varnish composition

To the copolymer of Example VIII, 0.5% Pb and 0.05% Co metal were added in the form of soluble naphthenates. The resulting varnish yielded clear glossy films which dried tack free in less than two hours, and dried hard overnight. A flat-grain redwood panel was coated with the varnish and exposed at 45° south, Chicago, Ill., an angle and direction selected for producing severe weathering conditions.

The varnish was in good condition after twelve months exposure, indicating substantially improved durability over control varnishes based on unmodified urethane oils.

It can be seen that the level of tolylene diisocyanate in this example was over ten times that used in Example VII, yet because of the low over-all functionality and the low level of hydroxyalkyl methacrylate, gelation did not occur during the preparation.

Example X.—Alkyd resin

| | Grams |
|---|---|
| Soybean oil | 557 |
| Phthalic anhydride | 340 |
| Glycerol | 155 |
| Litharge | .75 |
| VM&P naphtha | 430 |

The alkyd resin was prepared according to the procedure of Example I. It had the following characteristics:

Viscosity (Gardner-Holdt) _____ 35.5 sec.
Non-volatile content _____ 70%.
Solvent _____ VM&P naphtha.
Acid value of non-volatile _____ 9.85.
Color _____ 4.
Appearance _____ Bright and stable.

Example XI.—Vinyl toluenated alkyd resin

| | Grams |
|---|---|
| Alkyd resin (Example X) | 600 |
| Vinyl tolylene | 385 |
| 40% hydroxypropyl methacrylate | 20 |
| Tolylene diisocyanate | 10 |
| VM&P naphtha | 649 |
| Benzoyl peroxide | 12 |

The alkyd resin prepared in Example X was copolymerized according to the above formula utilizing the method of Example II. This low temperature copolymer had the following characteristics:

Viscosity (Gardner-Holdt) _____ 17.2 sec.
Non-volatile content _____ 48.25.
Solvent _____ VM&P naphtha.
Color (Gardner-Holdt) _____ 3–4.
Acid number of non-volatile _____ 6.5.
Appearance _____ Bright and stable.

This copolymer resin was made into a varnish by adding VM&P naphtha to reduce the non-volatile content to 40% and 0.25% Pb and 0.025% Co metal as soluble naphthenates were added.

A second varnish was prepared from a copolymer resin of nearly the same gross composition, except that the second copolymer resin was prepared by conventional high temperature copolymerization techniques. This second varnish was prepared at the same non-volatile content and drier metal content as the first. Films were laid down from both varnishes, side by side, and the speed of oxidative dry was checked through observations of hardness, toughness, and solvent resistance. After five minutes both varnishes were tack free and apparently dry, although they were both soft and waxy. After three hours, the high temperature copolymer was still soft and waxy. The low temperature copolymer, produced according to this invention, was already considerably harder and no longer soluble in VM&P naphtha. In five hours the low temperature copolymer was hard dry and somewhat mar resistant, while the high temperature material was showing only slightly improved hardness and was still quite soluble.

After twenty-four hours, the low temperature copolymer was quite insoluble and resistant to VM&P naphtha.

After forty-eight hours, the high temperature copolymer remained very sensitive to the attack of its original solvent, VM&P naphtha.

The conversion of the copolymer film into an insoluble state is recognized by those skilled in the practice of the coatings art as one of the principal criteria for ascertaining the extent of oxidative dry. One of the main drawbacks of the copolymer alkyds of the prior art has been their poor solvent resistance. The copolymer resins produced according to this invention are sharply improved in this respect.

All of the materials utilized in the foregoing examples are commercial grade.

It is to be recognized that the novel copolymer compositions of this invention may be easily incorporated in paints which may further include pigments, driers, solvents, and various other well known additives.

The foregoing invention can now be practiced, and such practitioners will know that the invention is not restricted to the particular embodiments presented herein. The scope of the invention is to be defined by the terms of the following claims as given meaning by the preceding description.

I claim:

1. A vinyl modified alkyd or urethane resin composition including an intermediate represented by the formula:

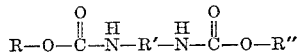

where R is a resinous material selected from the class consisting of alkyd resins and polyurethane resins, R' is an arylidene radical and R" is a residue of a copolymerizable hydroxyl functional monomer, which is a hydroxyloweralkyl ester of an acid of the class of acrylic acid and methacrylic acid, and a vinyl monomer copolymerized with the hydroxyl functional monomer of said intermediate.

2. A vinyl modified resin as in claim 1 further characterized in that the vinyl monomer copolymerized with the hydroxyl functional monomer of said intermediate is selected from the class consisting of styrene, vinyl acetate, vinyl toluene, an acrylic ester and a methacrylic ester.

3. A vinyl modified resin as in claim 1 further characterized in that the alkyd or polyurethane resin portion comprises about 30% to about 80% by weight of the vinyl modified resin.

4. A vinyl modified resin as in claim 1 further characterized in that said R" residue comprises less than about 2% by weight of the vinyl modified resin.

5. A composition as in claim 1 further characterized in that the resin is a vinyl modified alkyd resin, R is the residue of an alkyd resin, R' is a tolylene radical obtained from tolylene diisocyanate, and said tolylene diisocyanate is present in about stoichiometric amounts relative to said hydroxyl functional monomer.

6. A composition as in claim 1 further characterized in that the resin is a vinyl modified polyurethane resin, R is the residue of a polyurethane resin, R' is a tolylene radical, obtained from tolylene diisocyanate, and said tolylene diisocyanate is present in about 4% to about 25% by weight relative to said vinyl modified polyurethane resin.

7. A vinyl modified resin as in claim 1 further characterized by and including an organic solvent and a heavy metal soluble naphthenate to provide a varnish composition.

8. A coating composition as in claim 7 further characterized by and including pigments to provide a paint.

9. A method for preparing vinyl modified alkyd and urethane resins which includes first preparing an intermediate by the steps of combining about 30–80% by weight of a resinous material selected from the class consisting of an alkyd resin and a polyurethane resin, an arylidene diisocyanate, and less than about 2% by weight of a copolymerizable hydroxyl functional monomer, which monomer is a hydroxyloweralkyl ester of an acid of the class of acrylic acid and methacrylic acid, providing further that said hydroxyl functional monomer is combined with said resinous material prior to combination with said arylidene diisocyanate, further providing that said arylidene diisocyanate is added in substantially stoichiometric amounts when said resinous material is an alkyd resin, and said arylidene diisocyanate is added in amounts in excess of stoichiometric when said resinous material is a polyurethane resin, whereby an intermediate is obtained represented by the formula:

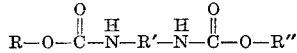

where R is the resinous material selected from the class consisting of said alkyd resins and said polyurethane resins, R' is said arylidene radical from said diisocyanate, and R" is the residue of said copolymerizable functional monomer.

10. A method as in claim 9 further characterized by and including the step of copolymerizing the formed intermediate with a vinyl monomer.

References Cited

UNITED STATES PATENTS

| | | | |
|---|---|---|---|
| 3,245,941 | 4/1966 | Mayer et al. | 260—31.6 |
| 3,304,273 | 2/1967 | Stamberger | 260—2.5 |
| 3,367,992 | 2/1968 | Bearden | 260—2.5 |
| 2,970,123 | 1/1961 | Rhodes et al. | |
| 3,007,894 | 11/1961 | Bunge et al. | |

FOREIGN PATENTS 576,453  5/1959  Canada.

HOSEA E. TAYLOR, Jr., Primary Examiner

R. W. GRIFFIN, Assistant Examiner

U.S. Cl. X.R.

117—148, 161, 167; 260—23, 33.6, 40, 41, 75, 77.5, 859